United States Patent
Furukawa

(10) Patent No.: US 12,050,985 B2
(45) Date of Patent: Jul. 30, 2024

(54) ARITHMETIC PROCESSING DEVICE

(71) Applicant: OLYMPUS CORPORATION, Hachioji (JP)

(72) Inventor: Hideaki Furukawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 889 days.

(21) Appl. No.: 17/132,575

(22) Filed: Dec. 23, 2020

(65) Prior Publication Data

US 2021/0117762 A1   Apr. 22, 2021

Related U.S. Application Data

(63) Continuation of application No. PCT/JP2018/023974, filed on Jun. 25, 2018.

(51) Int. Cl.
*G06F 7/57* (2006.01)
*G06N 3/063* (2023.01)
*G06N 3/08* (2023.01)

(52) U.S. Cl.
CPC ............... *G06N 3/063* (2013.01); *G06F 7/57* (2013.01); *G06N 3/08* (2013.01)

(58) Field of Classification Search
CPC ............. G06N 3/063; G06N 3/08; G06F 7/57
See application file for complete search history.

(56) References Cited

U.S. PATENT DOCUMENTS

| | | | |
|---|---|---|---|
| 2017/0024632 A1* | 1/2017 | Johnson | G06F 3/0644 |
| 2017/0277658 A1* | 9/2017 | Pratas | G06N 3/063 |
| 2017/0344876 A1* | 11/2017 | Brothers | G06N 3/082 |
| 2017/0344882 A1* | 11/2017 | Ambrose | G06N 3/045 |
| 2018/0121795 A1 | 5/2018 | Kato et al. | |
| 2018/0173571 A1* | 6/2018 | Huang | G06N 3/063 |
| 2018/0189643 A1* | 7/2018 | Kim | G06V 10/96 |
| 2018/0307980 A1* | 10/2018 | Barik | G06F 9/3851 |
| 2018/0336462 A1* | 11/2018 | Brothers | G06N 3/08 |
| 2019/0187898 A1* | 6/2019 | Gu | G06F 3/0604 |

(Continued)

FOREIGN PATENT DOCUMENTS

| | | | | |
|---|---|---|---|---|
| CA | 3066775 A1 * | 4/2019 | | G06F 18/00 |
| CN | 107273832 A * | 10/2017 | | G06K 9/00791 |
| JP | 2009-80693 A | 4/2009 | | |

(Continued)

OTHER PUBLICATIONS

International Search Report dated Sep. 4, 2018, issued in counterpart International Application No. PCT/JP2018/023974, with English Translation. (2 pages).

(Continued)

*Primary Examiner* — Shahid K Khan
(74) *Attorney, Agent, or Firm* — WHDA, LLP

(57) ABSTRACT

An SRAM write controller of an arithmetic processing device for deep learning, which performs a convolution processing and a full-connect processing, virtually divides each SRAM constituting a data storage memory into a plurality of areas, switches the area to be written by the ID and controls so that different input feature maps of the same coordinate are stored in the same SRAM, and controls such that different input feature value map data of the same coordinate is stored in the same SRAM.

4 Claims, 12 Drawing Sheets

(56) References Cited

U.S. PATENT DOCUMENTS

2020/0005119 A1* 1/2020 Shemesh ................ G06N 3/082
2021/0097375 A1* 4/2021 Huynh ..................... G06F 7/50

FOREIGN PATENT DOCUMENTS

| JP | 2017-151604 A | 8/2017 | | |
|----|---|---|---|---|
| JP | 2018-73102 A | 5/2018 | | |
| JP | 2021009566 A | * | 1/2021 | ............. G06N 3/045 |
| WO | WO-2016122787 A1 | * | 8/2016 | ............. G06N 20/00 |

OTHER PUBLICATIONS

Office Action dated Oct. 19, 2021, issued in counterpart JP Application No. 2020-526727, with English translation. (4 pages).

* cited by examiner

FIG. 9A iFM1
DATA ARRANGEMENT

| a1 | b1 | c1 | d1 |
|----|----|----|----|
| e1 | f1 | g1 | h1 |
| i1 | j1 | k1 | l1 |
| m1 | n1 | o1 | p1 |

FIG. 9B iFM1
FILTER COEFFICIENT

| w1 | w2 | w3 |
|----|----|----|
| w4 | w5 | w6 |
| w7 | w8 | w9 |

FIG. 9C iFM2
DATA ARRANGEMENT

| a2 | b2 | c2 | d2 |
|----|----|----|----|
| e2 | f2 | g2 | h2 |
| i2 | j2 | k2 | l2 |
| m2 | n2 | o2 | p2 |

FIG. 9D iFM2
FILTER COEFFICIENT

| x1 | x2 | x3 |
|----|----|----|
| x4 | x5 | x6 |
| x7 | x8 | x9 |

ARITHMETIC PROCESSING DEVICE

CROSS REFERENCE TO RELATED APPLICATIONS

This application is a continuation application based on a PCT Patent Application No. PCT/JP2018/023974, filed on Jun. 25, 2018, the content of which is incorporated herein by reference.

BACKGROUND

Technical Field

The present invention relates to an arithmetic processing device, more specifically, a circuit configuration of an arithmetic processing device that performs deep learning using a convolutional neural network.

Background Art

Conventionally, there is an arithmetic processing device that performs an arithmetic using a neural network in which a plurality of processing layers are hierarchically connected. In particular, in arithmetic processing devices that perform image recognition, deep learning using a convolutional neural network (hereinafter referred to as CNN) is widely performed.

In image recognition by deep learning using CNN, input image data (pixel data) is sequentially processed in a plurality of processing layers of CNN, so that the final arithmetic result data in which the object included in the image is recognized is obtained. The CNN processing layer is roughly classified into a convolution layer and a full-connect layer. The convolution layer performs a convolution processing including a convolution arithmetic processing, a non-linear processing, a reduction processing (pooling processing), and the like. The full-connect layer performs a full-connect processing that multiplies all inputs (pixel data) by coefficient and cumulatively adds them.

Image recognition by deep learning using CNN can realize a high recognition rate. However, in order to increase the types of subjects to be detected and to improve the subject detection accuracy, it is necessary to increase the network. Then, the data storage buffer and the coefficient storage buffer inevitably have a large capacity, but the LSI (Large-Scale Integrated circuit) cannot be equipped with a large capacity memory.

In deep learning for image recognition processing, the relationship between the FM (Feature Map) size and the number of FMs (the number of planes of FM) in the (K−1)-th layer and the K-th layer may be as shown in the following equation in many cases, and when determining the memory size as a circuit, it is difficult to optimize it.

FM size $[K] = \frac{1}{4} \times$ FM size $[K-1]$

FM number $[K] = 2 \times$ FM number $[K-1]$

For example, when considering the memory size of a circuit that can support Yoro_v2, which is one of the variations of CNN, about 1 GB is required if it is determined only by the FM size and the maximum value of the FM number. Actually, since the number of FMs and the FM size are inversely proportional to each other, about 3 MB is sufficient for arithmetic, but memory management must be carefully calculated and designed for each layer.

Due to such problems, a CNN is generally implemented by software processing using a high-performance PC or GPU (Graphics Processing Unit). However, in order to realize high-speed processing, it is preferable to configure the heavy processing part with hardware. An example of such hardware implementation is described in Japanese Unexamined Patent Publication No. 2017-151604 (hereinafter referred to as Patent Document 1).

Patent Document 1 discloses an arithmetic processing device in which a plurality of arithmetic blocks and a plurality of memories are mounted to improve the efficiency of arithmetic processing. It has multiple arithmetic processing units, each of which has an arithmetic block and a buffer paired with it. By performing convolution arithmetic processing in parallel via a relay unit and exchanging cumulative addition data between the arithmetic units, even if the input network is large, it is possible to generate inputs for activation processing all at once.

Patent Document 1 has a configuration in which a arithmetic block and a data holding unit are paired, and a network exceeding the number of arithmetic blocks can be dealt with by repeatedly performing cumulative addition via a redundant data holding unit. However, specific control, especially the data holding unit, requires optimization of the buffer and control to cope with the relationship between the number of FMs and the FM size as described above, but this is not taken into consideration.

SUMMARY

An embodiments of the present invention provides a memory-sized arithmetic processing device that can be applied to deep learning and can be reasonably mounted on an LSI.

An aspect of the present invention provides an arithmetic processing device for deep learning that performs convolution processing and full-connect processing, comprising: a data storage memory manager including a data storage memory composed of 3 or more SRAMs, a counter configured to count the number of valid input data from input feature map data and converts it into a coordinate, an SRAM write controller configured to convert the coordinate converted by the counter into an address in the data storage memory and store the input feature map data in the data storage memory, and an SRAM read controller configured to receive a request from outside and extract the stored input feature map data by a predetermined method from the data storage memory; a coefficient storage memory manager that has a coefficient storage memory for storing coefficients, refers to the status of the data storage memory manager, and extracts a coefficient corresponding to data to be extracted from the data storage memory manager from the coefficient storage memory; a data input part configured to acquire the input feature map data from an external storage memory; a coefficient input part configured to acquire the coefficient from the external storage memory; an arithmetic part with a configuration in which N-dimensional data is input, processed in parallel, and M-dimensional data is output (where N and M are positive numbers greater than 1), configured to acquire the input feature map data from the data storage memory, acquire the coefficient from the coefficient storage memory, and perform a filter processing, a cumulative addition processing, a non-linear arithmetic processing, and a pooling processing; a data output part configured to convert the M-dimensional data output from the arithmetic part to output as output feature map data to the external storage memory; a controller configured to control the data storage memory manager, the coefficient storage memory manager, the data input part, the data output part, and the arithmetic part; wherein the counter generates an ID of the input feature map data that has been input, the SRAM write controller virtually divides each of the SRAMs constituting the data storage memory into a plurality of areas, switches the area to be written by the ID and controls so that different input feature maps of the same coordinate are stored in the same SRAM, the SRAM read controller switches the address so as to access the area corresponding to the ID of the input feature map data to be extracted, the arithmetic part includes: a filter arithmetic part configured to perform a filter arithmetic on N-dimensional data in parallel, a first adder configured to cumulatively add arithmetic results of the filter arithmetic part, a second adder configured to cumulatively add cumulative addition results of the first adder in a subsequent stage, and a flip-flop configured to hold a cumulative addition result of the second adder, and an arithmetic controller configured, to generate an ID of the input feature map data, to acquire from the coefficient storage memory manager the coefficient of the same ID as the input feature map data input from the SRAM read controller, and to control the second adder to cumulatively add cumulative addition results of the first adder until all input feature map data is collected, so as to extract a plurality of input feature map data stored in one data storage memory.

According to another aspect of the present invention, the arithmetic part may performs arithmetic processing for each input feature map data of the same coordinate, and the SRAM write controller may release the area in which the input feature map data of the same coordinate is stored every time the arithmetic processing of the input feature map data of the same coordinate is completed, and store data that is a continuation of the input feature map data.

According to another aspect of the present invention, the SRAM read controller may read the input feature map data from the data storage memory so as to perform arithmetic processing on one input feature map data to output the output feature map data for m sheets, and the data output part may count valid data to identify the output feature map data, and appropriately generate an address in the output feature map data to output to the external storage memory.

According to another aspect of the present invention, the SRAM read controller may read a portion of the input feature map data from the data storage memory, the arithmetic part may perform arithmetic processing of the portion of the input feature map data input from the SRAM read controller to generate part of the output feature map data, and, when a processing of the portion of the input feature map data is completed, another portion of the input feature map data may be processed.

According to the arithmetic processing device according to each aspect of the present invention, even if the iFM (input feature map) size or the number of iFMs (the number of planes of iFM) is too large to fit in the data storage memory (IBUF), arithmetic processing and data update can be performed seamlessly without overlapping the filter size.

BRIEF DESCRIPTION OF THE DRAWINGS

FIGS. 9A to 9D are diagrams showing examples of iFM data arrangement and coefficients in the arithmetic processing device according to the embodiment of the present invention.

DETAILED DESCRIPTION OF THE PREFERRED EMBODIMENTS

First Embodiment

Figure 1:
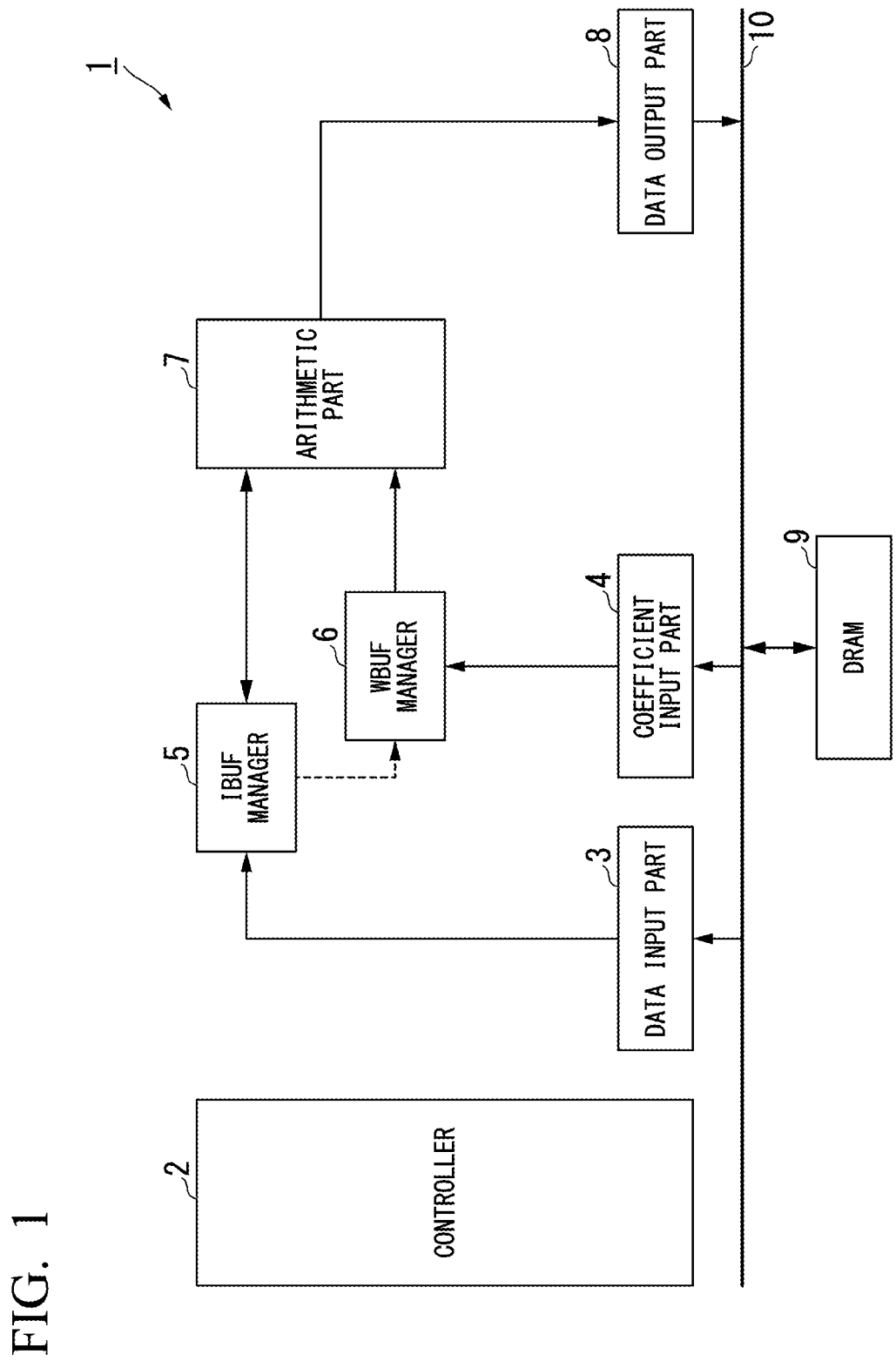
FIG. 1 is a block diagram showing a configuration of an arithmetic processing device according to an embodiment of the present invention.

An embodiment of the present invention will be described with reference to the drawings. FIG. 1 is a block diagram showing a configuration of an arithmetic processing device according to the embodiment of the present invention.

The arithmetic processing device 1 includes a controller 2, a data input part 3, a coefficient input part 4, an IBUF (data storage memory) manager 5, a WBUF (coefficient storage memory) manager 6, an arithmetic part 7, and a data output part 8. The data input part 3, the coefficient input part 4, and the data output part 8 are connected to the DRAM (external storage memory) 9 via the bus 10. The arithmetic processing device 1 generates an output feature map (oFM) from an input feature map (iFM).

The IBUF manager 5 includes a memory for storing input feature map (iFM) data (data storage memory, IBUF), a management/control circuit for data storage memory (data storage memory control circuit), a counter 51 described later, an SRAM write controller 52, N IBUFs (data storage memories) (0 to N−1), and an SRAM read controller 53. Each IBUF is composed of three or more SRAMs.

The IBUF manager 5 counts the number of valid data in the input data (iFM data), converts it into a coordinate, further converts it into an IBUF address (address in IBUF), stores the data in the data storage memory, and extracts the iFM data from the data storage memory by a predetermined method. When a plurality of FMs are input, the IBUF manager 5 controls so that the data of the same coordinate are stored in the same IBUF.

The WBUF manager 6 has a memory for storing the coefficient (coefficient storage memory, WBUF) and a management/control circuit for the coefficient storage memory (coefficient storage memory control circuit). The WBUF manager 6 refers to the status of the IBUF manager 5, and extracts from the coefficient storage memory a coefficient corresponding to data to be extracted from the IBUF manager 5.

The DRAM 9 stores iFM data, oFM data, and coefficients. The data input part 3 acquires an input feature map (iFM) from the DRAM 9 by a predetermined method, and transmits it to the IBUF (data storage memory) manager 5. The data output part 8 writes output feature map (oFM) data to the DRAM 9 by a predetermined method. Specifically, the data output part 8 unifies the M data that are output in parallel from the arithmetic part 7 (M-dimensional data), and outputs the data to the DRAM 9. The coefficient input part 4 acquires the coefficient from the DRAM 9 by a predetermined method and transmits it to the WBUF (coefficient storage memory) manager 6.

The arithmetic part 7 acquires data from the IBUF (data storage memory) manager 5 and coefficients from the WBUF (coefficient storage memory) manager 6, and performs data processing such as filter processing, cumulative addition, non-linear arithmetic, and pooling processing. The controller 2 controls the entire circuit.

In CNN, similar processes are performed on a plurality of processing layers. In a case where the arithmetic processing device 1 according to the embodiment of the present invention is used, the arithmetic part 7 has only the data and coefficients necessary for the processing for one layer and performs the processing for one layer, and the data and the coefficients are placed in the DRAM 9 one by one. Then, the processing for the required number of layers is repeatedly performed. The arithmetic processing device 1 outputs a subject estimation result as final output data and acquires the subject estimation result by processing the final output data using a processor (or a circuit).

Figure 2:
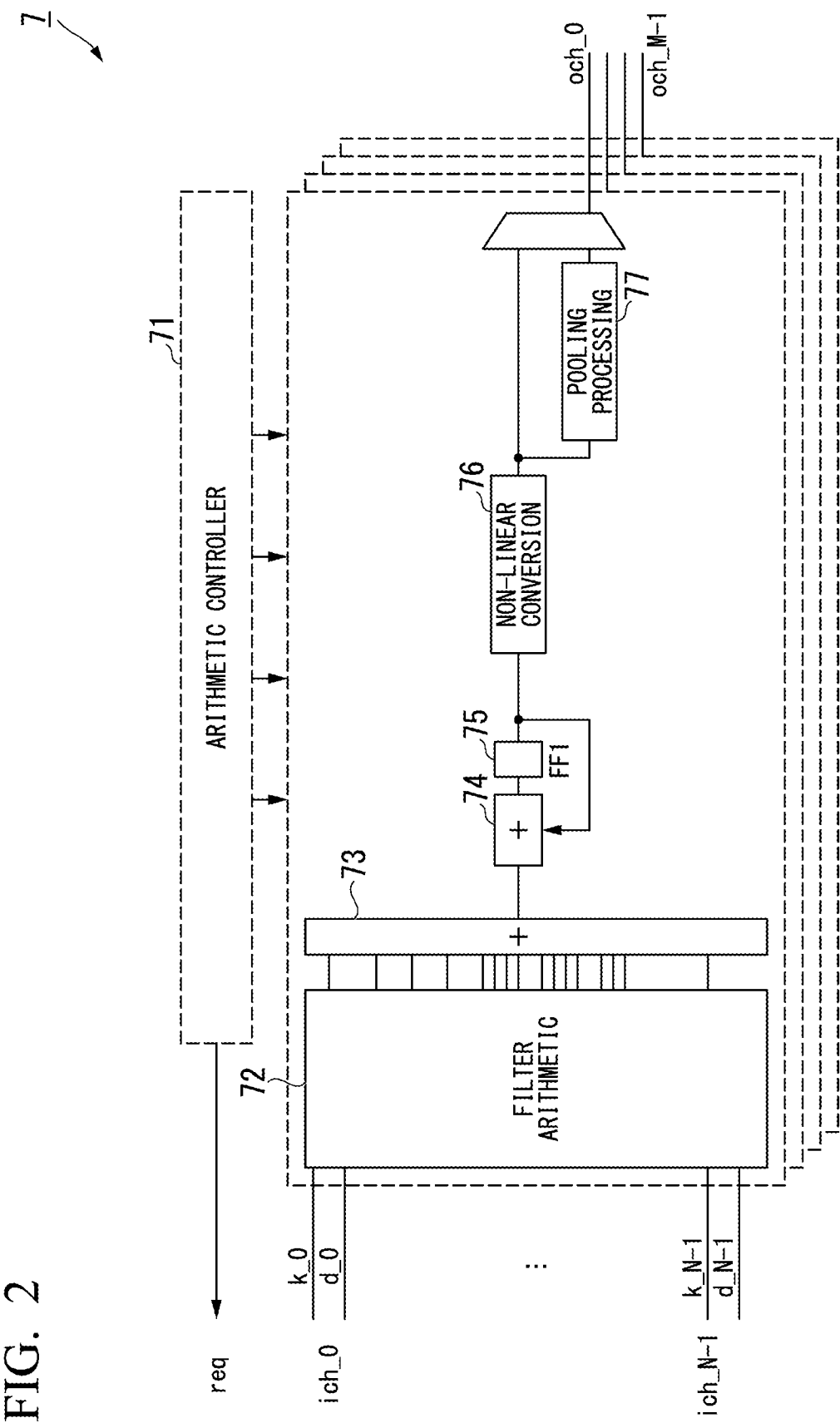
FIG. 2 is a diagram showing a configuration of an arithmetic part of an arithmetic processing device according to the embodiment of the present invention.

FIG. 2 is a diagram showing a configuration of the arithmetic part 7 of the arithmetic processor according to the embodiment of the present invention. The number of input channels of the arithmetic part 7 is N (where N is a positive number of 1 or more), that is, the input data (iFM data) is N-dimensional, and the N-dimensional input data is processed in parallel (input is N-parallel).

The number of output channels of the arithmetic part 7 is M (where M is a positive number of 1 or more), that is, M data is output in parallel (output is M-dimensional). As shown in FIG. 2, iFM data (d_0 to d_N−1) and coefficients (k_0 to k_N−1) are input for each channel (ich_0 to ich_N−1) in one layer, to output one data. This process is performed in parallel with the M layer, and M data och_0 to och_M−1 are output.

As described above, the arithmetic part 7 has a configuration in which the number of input channels is N the number of output channels is M, and the degree of parallelism is N×M. Since the size of the number of input channels N and the size of the number of output channels M can be set (changed) according to the size of the CNN, they are appropriately set in consideration of the processing performance and the circuit scale.

The arithmetic part 7 includes an arithmetic controller 71 that controls each unit in the arithmetic part. For each layer, the arithmetic part 7 includes a filter arithmetic part 72, a first adder 73, a second adder 74, an FF (flip-flop) 75, a non-linear conversion unit 76, and a pooling processor 77. There are M such layers.

The arithmetic controller 71 issues a request to the previous stage of the arithmetic part 7, so that predetermined data is input to the filter arithmetic part 72. The filter arithmetic part 72 is internally configured so that the multiplier and the adder can be simultaneously operated in N-parallel, and performs the filter processing on the input data to output the results of the filter processing in N-parallel.

The first adder 73 adds all the results of the filter processing in the filter arithmetic part 72 performed and output in N-parallel. The second adder 74 cumulatively adds the arithmetic results of the first adder 73, which are input in a time division manner. The second adder 74 cumulatively adds the arithmetic results of the first adder 73 until all the iFM data is collected. The FF 75 is provided to hold the result of the cumulative addition. The non-linear conversion unit 76 performs non-linear arithmetic processing by an activate function or the like on the result of cumulative addition in the second adder 74 and the FF 75. The specific implementation is not specified, but for example, non-linear arithmetic processing is performed by polygonal line approximation.

The pooling processor 77 performs pooling processing such as selecting and outputting (max pooling) the maximum value from a plurality of data input from the non-linear conversion unit 76, calculating the average value (average polling), and the like. The non-linear conversion unit 76 and the pooling processor 77 can be passed through by the arithmetic controller 71.

The arithmetic controller 71 controls the above-mentioned processing performed in each unit in the arithmetic part 7. With such a configuration, the size of the number of input channels N and the size of the number of output channels M can be set (changed) in the arithmetic part 7 according to the size of the CNN, so that they are set appropriately taking the processing performance and the circuit scale into consideration.

Figure 3:
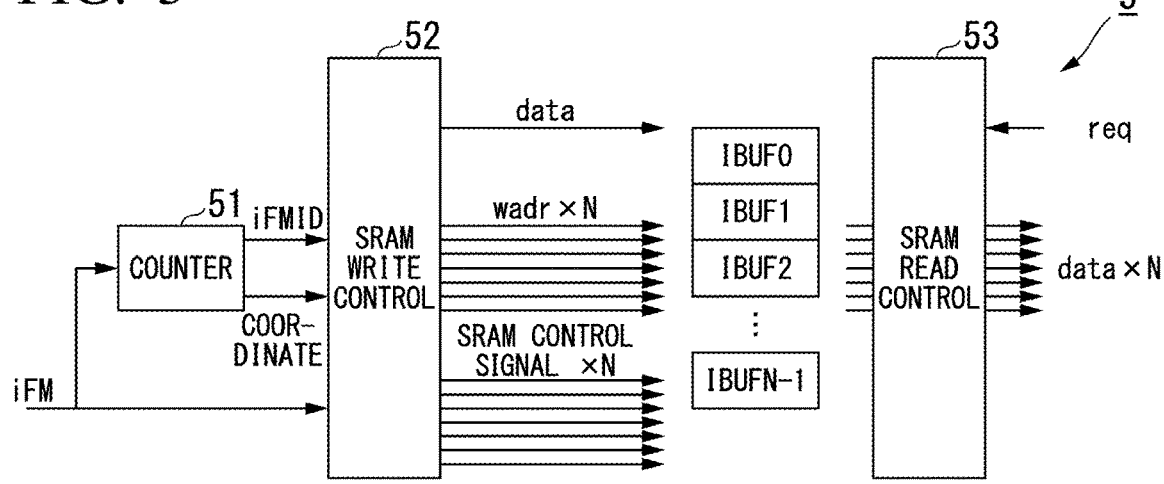
FIG. 3 is a diagram showing a configuration of an IBUF (data storage memory) manager of the arithmetic processing device according to the embodiment of the present invention.

FIG. 3 is a diagram showing a configuration of an IBUF (data storage memory) manager 5 of the arithmetic processing device according to the embodiment of the present invention. The IBUF manager 5 includes a counter 51, an SRAM write controller 52, N IBUFs (data storage memories) (0 to N−1), and an SRAM read controller 53.

When the number of input iFM (input feature map) data exceeds the degree of parallelism N of the input, the iFM data may be input in a time-division manner. Therefore, an ID (hereinafter referred to as iFMID) for identifying which iFM data is input is required. The iFMID is a representative value determined for the data acquired from the DRAM 9 by the data input part 3 in units of burst transfer and is sequentially incrementally changed, as the iFMID of first to N-th planes is 0, the iFMID of (N+1)-th to 2N-th planes is 1, and the like.

The counter 51 generates an ID (iFMID) of iFM data that has been input, counts the number of valid data (number of input valid data) in the input data for each iFMID and converts the data into a coordinate (iFM coordinate) to output.

The SRAM write controller 52 converts the iFM coordinate output from the counter 51 into an IBUF address (address in IBUF), and stores the data (iFM data) in IBUF. Further, the SRAM write controller 52 virtually divides each SRAM constituting the IBUF into a plurality of areas, and switches the area to be written by the iFMID. Further, the SRAM write controller 52 controls so that different iFM data of the same coordinate are stored in the same SRAM.

Further, the SRAM write controller 52 releases the area in which the iFM data of the same coordinate is stored every time the arithmetic processing of the iFM data of the same coordinate is completed, and stores the data following the iFM data.

The SRAM read controller 53 receives a request (req) from the outside and extracts data from the IBUF by a predetermined method. Further, the SRAM read controller 53 switches the address so as to access the area in the IBUF corresponding to the iFMID to be extracted.

In order to extract a plurality of iFMs stored in one IBUF, the arithmetic controller 71 of the arithmetic part 7 generates an iFMID and controls so as to acquire from the WBUF the coefficient of the same iFMID as the iFM data input from the SRAM read controller 53. Further, the arithmetic controller 71 uses the second adder 74 to cumulatively add the arithmetic results of the first adder 73 until all the iFM data is collected.

Figure 4:
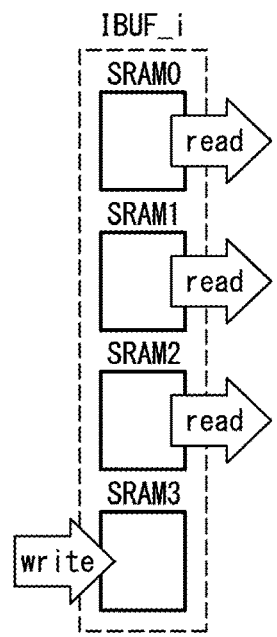
FIG. 4 is a diagram showing a configuration of an IBUF (data storage memory) of the arithmetic processing device according to the embodiment of the present invention.

FIG. 4 is a diagram showing a configuration of the IBUF (data storage memory) of the arithmetic processing device according to the present embodiment. Each IBUF is composed of three or more SRAMs. In the example of FIG. 4, one IBUF (IBUF_i) is composed of four SRAMs, and three SRAMs (SRAM0 to SRAM2) are used to extract data necessary for the filter arithmetic. The remaining one SRAM (SRAM 3) is used for writing the data acquired from the DRAM.

The data that is no longer needed after the processing in the arithmetic part 7 is sequentially released in units of each SRAM, and the IBUF as a whole operates as a circulate buffer. In this example, the IBUF is composed of four SRAMs, but the number of SRAMs may be any number as long as it is three or more. By setting the number of SRAMs to 3 or more, for example, even if the read positions overlap (straddle) the SRAM 1 and the SRAM 2, writing to the SRAM 3 can be performed in parallel while data is being sequentially extracted.

When using of the SRAM 1 is completed, it is released for write. Since writing to the SRAM 3 will be completed during the execution of the process, the write process will move to the SRAM 1 which has already been released. The read side continues the filter processing using the areas of the SRAM 2 to the SRAM 3. In this way, seamless processing (sliding window processing) can be performed by sequentially releasing unused areas and updating data.

Next, a case where the number of iFMs (the number of planes of iFMs) exceeds the degree of input parallelism of the circuit and a plurality of FMs are input to one IBUF will be described. It is assumed that the number of iFMs=N×n (where N is degree of parallelism of input). Data on the n-plane will be input to each input channel. Therefore, the inside of the IBUF is divided by the number n of input planes, and the sliding window processing is performed in each of the divided areas. The data on the n-plane input to each input channel is divided and stored in the IBUF as shown in FIG. 5.

Figure 5:
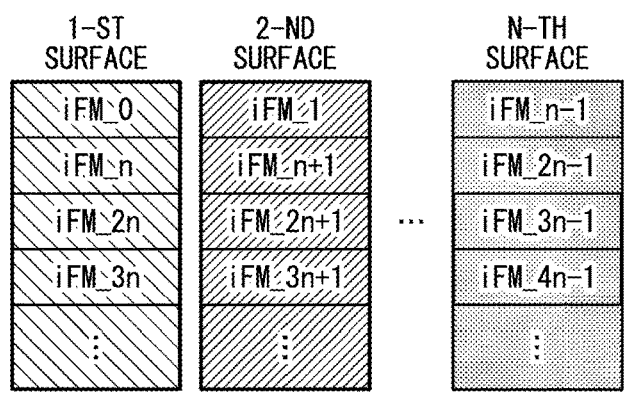
FIG. 5 is a diagram showing a state in which an iFM (input feature map) input to one input channel is divided and stored in the IBUF in the arithmetic processing device according to the embodiment of the present invention.
Figure 6:
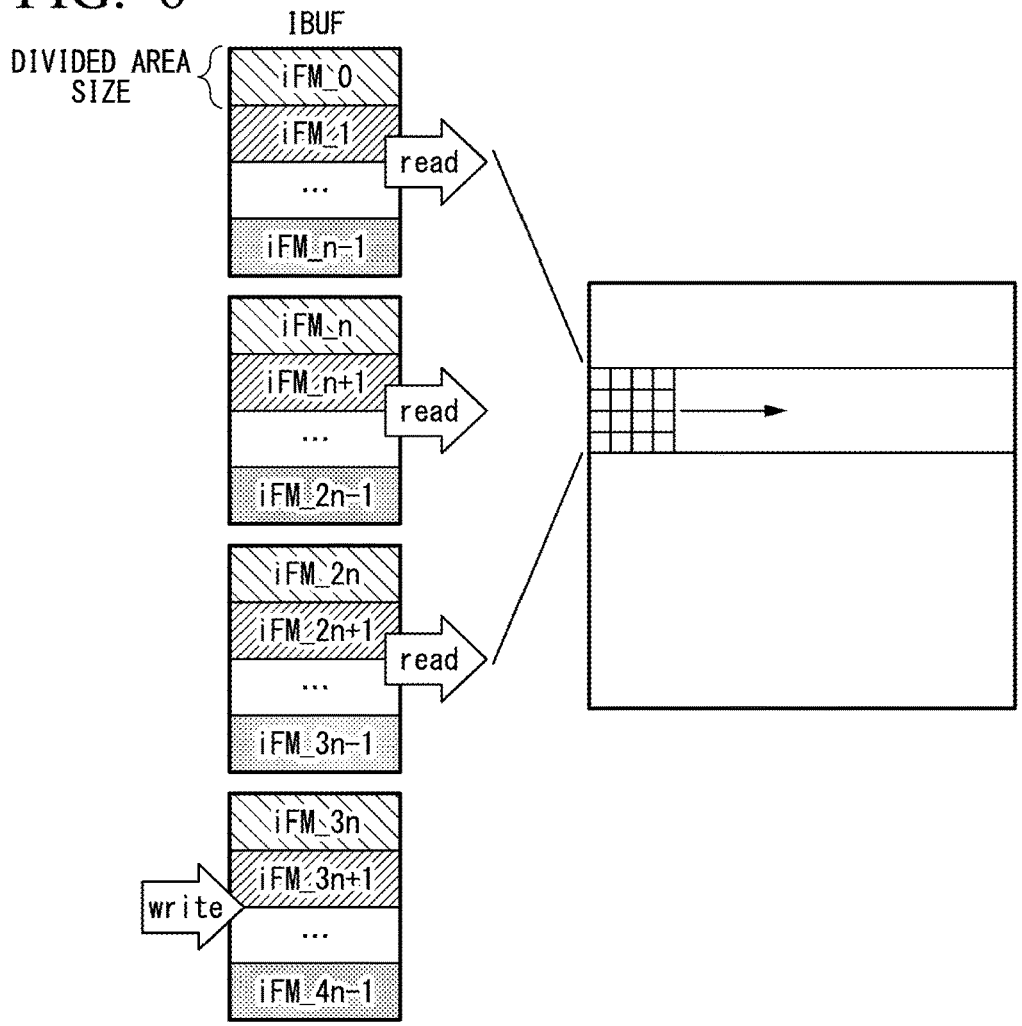
FIG. 6 is a diagram showing a state in which an iFM divided and stored in an IBUF is processed in the arithmetic processing device according to the embodiment of the present invention.

FIG. 5 is a diagram showing how iFMs input to one input channel are divided and stored in IBUF. FIG. 6 is a diagram showing how the iFM divided and stored in the IBUF is processed. The figure shows an example in which the IBUF is composed of four SRAMs (SRAM1, . . . , SRAM 4). That is, the IBUF is physically divided into four SRAMs.

Each SRAM (SRAM 1, . . . , SRAM 4) is virtually divided into n pieces. Data in the same area (coordinate) of iFM is stored in each divided area of SRAM. Specifically, the data iFM_0 to iFM_n−1 corresponding to the iFM area A are stored in the divided area of the SRAM 1. The iFM_n to iFM_2n−1 corresponding to the iFM area B are stored in the divided area of the SRAM 2. The iFM_2n to iFM_3n−1 corresponding to the iFM area C are stored in the divided area of the SRAM 3. The iFM_3n to iFM_4n−1 corresponding to the iFM area D are stored in the divided area of the SRAM 4.

That is, data at the same coordinate position of iFM is stored in one SRAM. This is because the data at the same coordinate position of the iFM is simultaneously extracted to perform arithmetic processing and sliding window processing. By setting the number of SRAMs to 3 or more, even when data processing (data reading from the SRAM 1 and the SRAM 2) spanning two areas (coordinates) of iFM is performed, writing to the third SRAM can be performed in parallel.

In the example of FIG. 6, the iFM_0 on the first plane, the iFM_1 on the second plane, . . . , and the iFM_n−1 on the n-th plane are data at the same coordinate position (area A), and these are stored in the divided area of SRAM 1. The iFM_n on the first plane, the iFM_(n+1) on the second plane, . . . , and the iFM_(2n−1) on the n-th plane are data at the same coordinate position (area B), and these are stored in the divided area of the SRAM 2. The iFM_2n on the first plane, the iFM_(2n+1) on the second plane, . . . , and the iFM_(3n−1) on the n-th plane are data at the same coordinate position (area C), and these are stored in the divided area of the SRAM 3. The iFM_3n on the first plane, the iFM_(3n+1) on the second plane, . . . , and the iFM_(4n−1) on the n-th plane are data at the same coordinate position (area D), and these are stored in the divided area of the SRAM 4.

The iFM_0, iFM_1, . . . , and iFM_(n−1) stored in the SRAM 1 are data at the same coordinate position, are processed at the same timing, and become unnecessary at the same timing. The SRAM in which unnecessary data is stored is sequentially released, and stores iFM_4n on the first plane, iFM_(4n+1) on the second plane, . . . , and iFM_(5n−1) on the n-th plane, which are continuation data of the iFM. In this way, the sliding window processing is performed.

Each virtually divided area size in one SRAM area is referred to as a "divided area size". The divided area size corresponds to the amount of iFM data that can be stored in each area. Since the used data can be discarded in units of the divided area size, by performing the sliding window processing in units of the divided area size and releasing the used area of the SRAM, it is possible to input the data following the iFM.

Specifically, in FIG. 6, the sliding window processing is performed in the divided area size (divided area size in which the data of the first plane is stored) in which iFM_0 of SRAM 1, iFM_n of SRAM 2, iFM_2n of SRAM 3, and iFM_3n of SRAM 4 are stored. At the same time, the sliding window processing is performed in the divided area size (divided area size in which the data of the second plane is stored) in which iFM_1 of SRAM 1, iFM_(n+1) of SRAM 2, iFM_(2n+1) of SRAM 3, and iFM_(3n+1) of SRAM 4 are stored. At the same time, the sliding window processing is performed in the divided area sire (divided area size in which the data of the n-th plane is stored) in which iFM_(n−1) of SRAM 1, iFM_(2n−1) of SRAM 2, iFM_(3n−1) of SRAM 3, and iFM_(4n−1) of SRAM 4 are stored.

In this way, in the present invention, each of the plurality of arithmetic parts processes a plurality of FMs by time division, which makes it possible to correspond to a large network.

Figure 7:
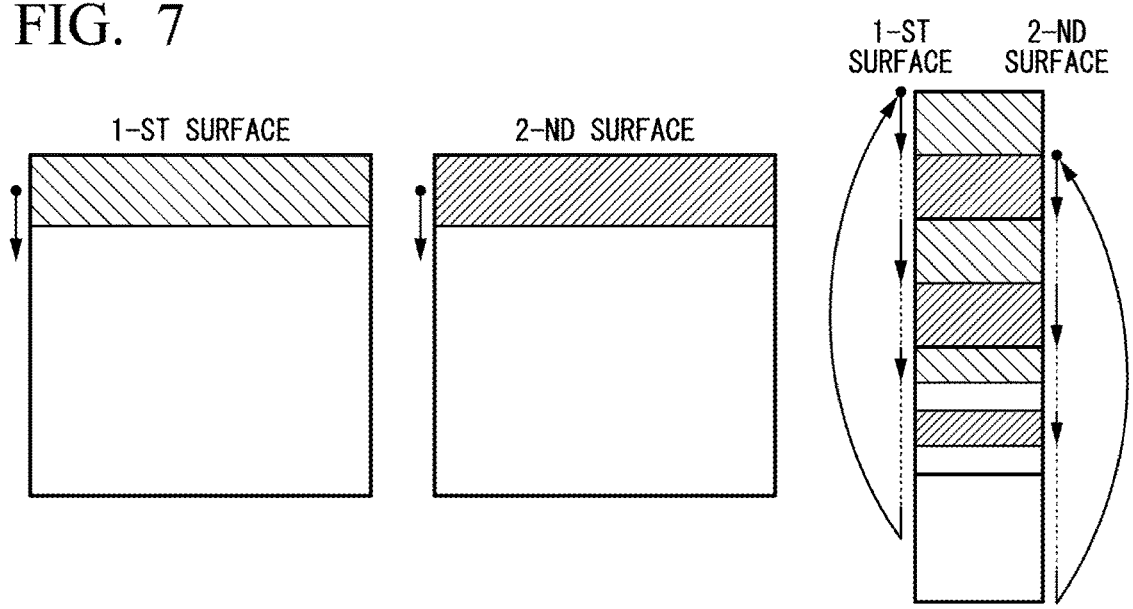
FIG. 7 is a diagram showing an image in which the address offset is changed by iFMID when n=2 in the arithmetic processing device according to the embodiment of the present invention.

Since the iFMID increases to 0, 1, 2, . . . , n−1 for each plane, the iFM can be arranged in the IBUF as shown in FIG. 6 by changing the address offset according to the iFMID. FIG. 7 is a diagram showing an image in which the address offset is changed by iFMID when n=2. When n=1, it is not necessary to refer to the iFMID, so the iFMID may be fixed to zero.

Figure 8:
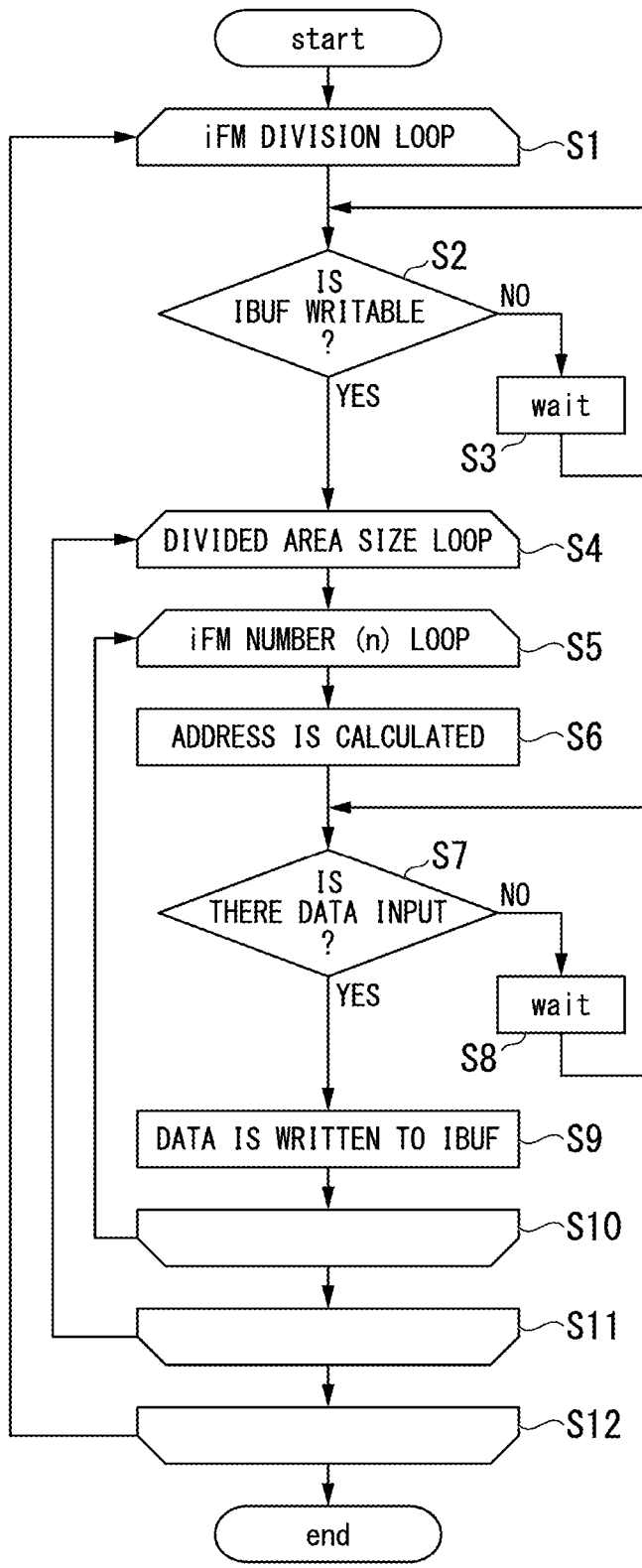
FIG. 8 is a diagram showing a data writing control flow to the IBUF in the arithmetic processing device according to the embodiment of the present invention.

FIG. 8 is a diagram showing a control flow of data writing to the IBUF in the arithmetic processing device according to the present embodiment. The iFM division loop starts from step S1. In step S2, it is determined whether or not the IBUF is writable. If the IBUF is unwritable, the process proceeds to step S3, waits, and returns to step S2.

If the IBUF is writable, the process proceeds to step S4. The divided area size loop starts from step S4, and the iFM number (n) loop starts from step S5. The address is calculated in step S6, and it is determined in step S7 whether or not there is data input. If there is no data input, the process proceeds to step S8, waits, and returns to step S7.

If there is data input, the process proceeds to step S9, and data is written to the IBUF. In step S10, it is determined whether or not the processing for the number of iFMs (n) has been performed. If not, the process returns to step S5, and if so, the process proceeds to step S11. In step S11, it is determined whether or not the processing corresponding to the size of the divided area has been performed. If not, the process returns to step S4, and if so, the process proceeds to step S12. In step S12, it is determined whether or not the iFM division is completed, and if it is not completed, the process returns to step S1, and if it is completed, the process (data writing process to IBUF) is terminated.

Next, the process for reading the data input to the IBUF as described above will be described. Although a plurality of iFMs are contained in each input channel, it is assumed that two iFMs (iFM1, iFM2) are input. Then, it is assumed that the data arrangement of the iFM and the coefficient of the filter applied to the data arrangement are as shown in FIGS. 9A to 9D. FIGS. 9A to 9D are diagrams showing an example of iFM data arrangement and coefficients.

In iFM1, the data arrangement is as shown in FIG. 9A, where a1, b1, . . . , p1 indicate data, and 4×4 data are arranged. Of these, the coefficients of the filter applied to each of the 3×3 data (a1, b1, c1, d1, e1, f1, g1, i1, j1, k1) are as shown in FIG. 9B, where w1, w2, . . . , w9 indicate each data coefficient.

Similarly, in iFM2, the data arrangement is as shown in FIG. 9C, where a2, b2, . . . , p2 indicate data, and 4×4 data are arranged. Of these, the coefficients of the filter applied to each of the 3×3 data (a2, b2, c2, d2, e2, f2, g2, i2, j2, k2) are as shown in FIG. 9D, where x1, x2, . . . , x9 indicate each data coefficient.

Figure 10:
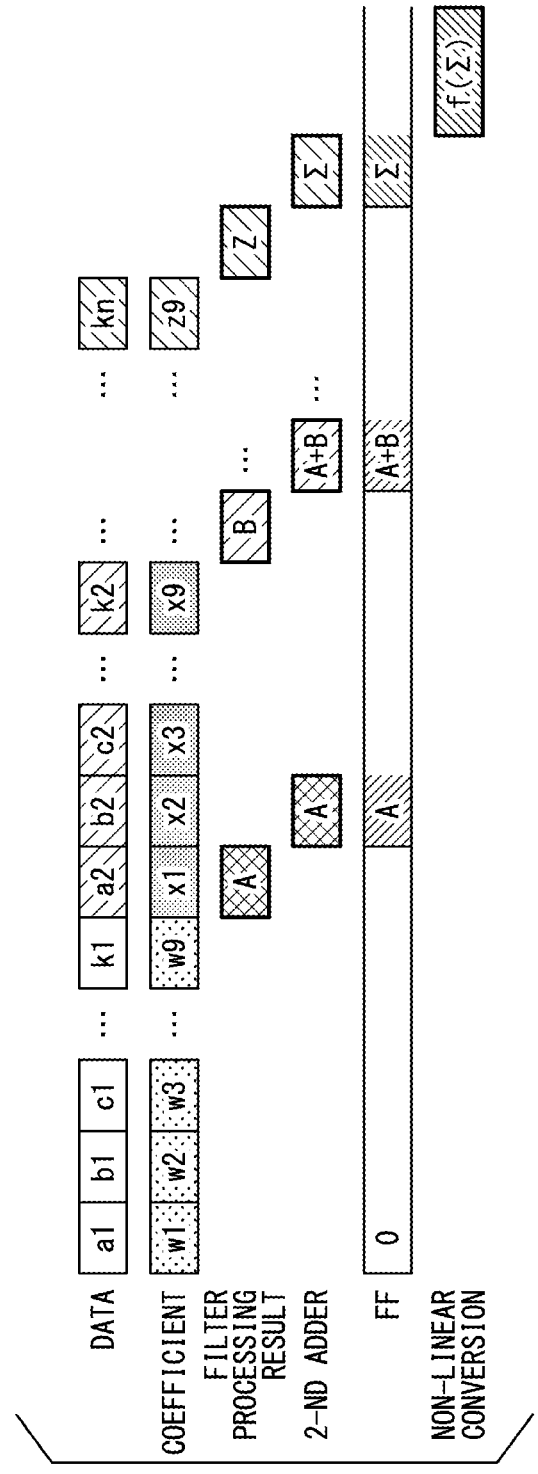
FIG. 10 is a diagram showing a timing chart at the time of convolution processing in the arithmetic processing device according to the embodiment of the present invention.

The timing chart is as shown in FIG. 10. FIG. 10 is a diagram showing a timing chart when the number of iFMs=2N during the convolution processing in the arithmetic processing device according to the present embodiment. The filter arithmetic result of the 3×3=9 data a1 to k1 and the coefficients w1 to w9 is A, and the filter arithmetic result of the 3×3=9 data a2 to k2 and the coefficients x1 to x9 is B. The filter arithmetic result is cumulatively added in the time direction in the second adder, and the result is held in the FF. The final cumulative addition result in the second adder is E.

That is, iFM1 and iFM2 are input in time division, cumulative addition is performed by the second adder, and the result is held in the FF. When the result of the second adder is A or A+B, the cumulative addition is still in progress and the result is not output to the non-linear conversion unit. When the cumulative addition in the second adder is completed, the cumulative addition result $\Sigma$ is output to the non-linear conversion unit, and the FF returns to the initial value. The non-linear conversion unit performs non-linear conversion $f(\Sigma)$.

Figure 11:
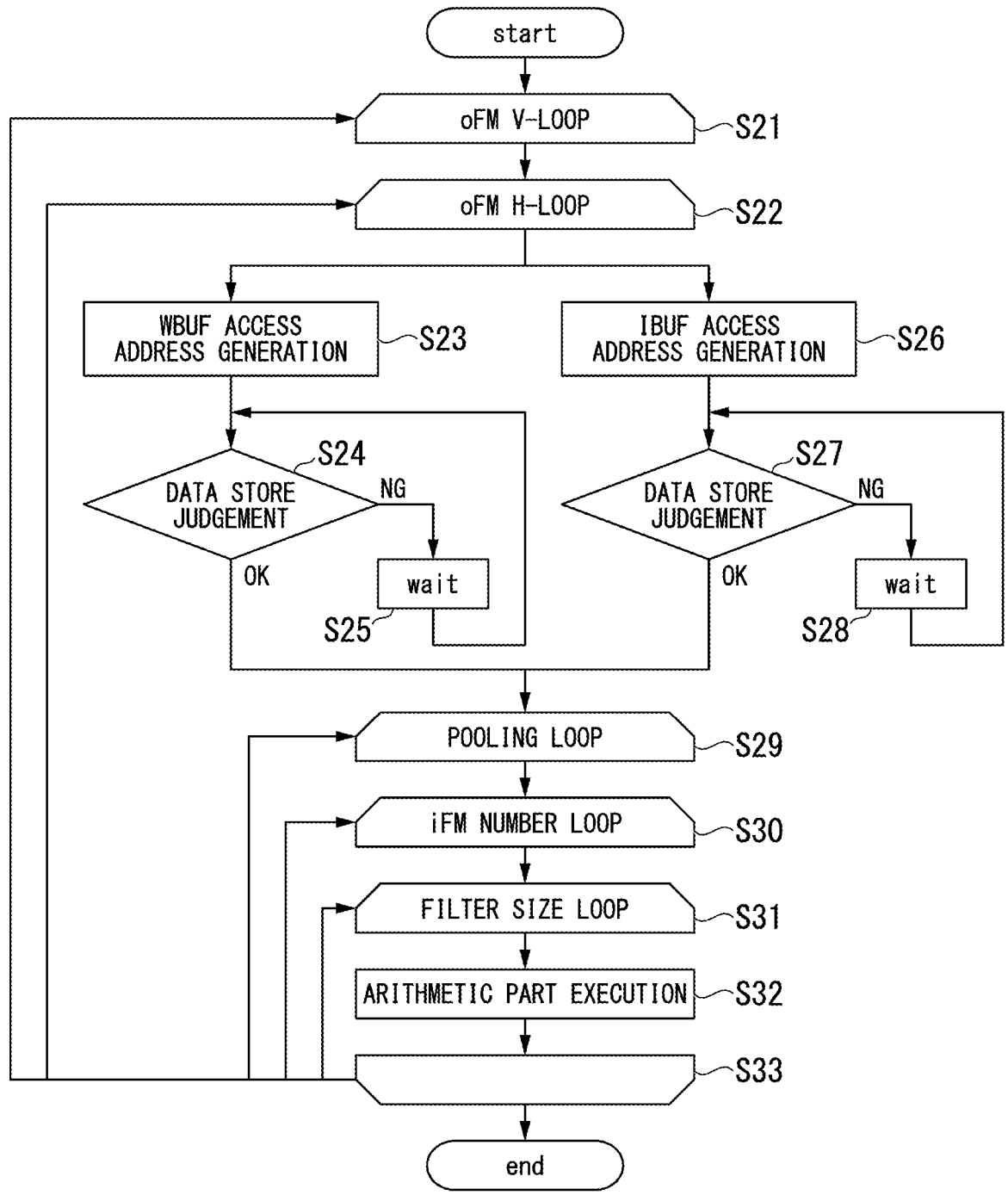
FIG. 11 is a diagram showing an example of a control flow of an SRAM read controller in the arithmetic processing device according to the embodiment of the present invention.

FIG. 11 is a diagram showing an example of a control flow of the SRAM read controller in the arithmetic processing device according to the present embodiment. First, in step S21, the oFM_V loop starts. The oFM_V loop is a loop that processes oFM data in the V direction (horizontal direction). Then, in step S22, the oFM_H loop starts. The oFM_H loop is a loop that processes oFM data in the H direction (vertical direction). The WBUF access address is generated in step S23, and the IBUF access address is generated in step S26 in parallel.

When the WBUF access address is generated in step S23, the data storage determination is performed in step S24. If the result of the data storage determination is good (OK), the process proceeds to the pooling loop in step S29. If the result of the data storage determination is not good (NG), the process waits in step S25 and returns to step S24.

Further, when the IBUF access address is generated in step S26, the data storage determination is performed in step S27. If the result of the data storage determination is good (OK), the process proceeds to the pooling loop in step S29. If the result of the data storage determination is not good (NG), the process waits in step S28 and returns to step S27.

After the pooling group in step S29, the process proceeds to the iFM number loop in step S30 and the filter size loop in step S31, and the processing of the arithmetic part is performed in step S32. In step S33, it is determined whether or not each loop may be completed. If not, the loop returns to each loop, and if all the loops are completed, the control flow ends.

The IBUF data storage determination is a determination as to whether the coordinate data of all iFMs required for the filter processing including the pooling process has been stored in the IBUF. The innermost loop is after the determination. The determination method can be changed in various ways. Further, if the determination is made in the H size unit of oFM, the oFM_H loop is also placed after the data storage determination.

The memory control and memory storage methods described in this embodiment can also be applied to an algorithm that generates output data by inputting a plurality of frames. For example, it can be applied to compression processing such as MPEG using inter-frame correlation and noise reduction processing.

Second Embodiment

In the first embodiment, a circuit for processing one CNN layer and how to deploy and process the iFM input to the circuit to the IBUF have been described. The second embodiment particularly corresponds to a case where the number of oFMs (the number of planes of oFMs) exceeds the degree of parallelism M in the circuit.

Figure 12:
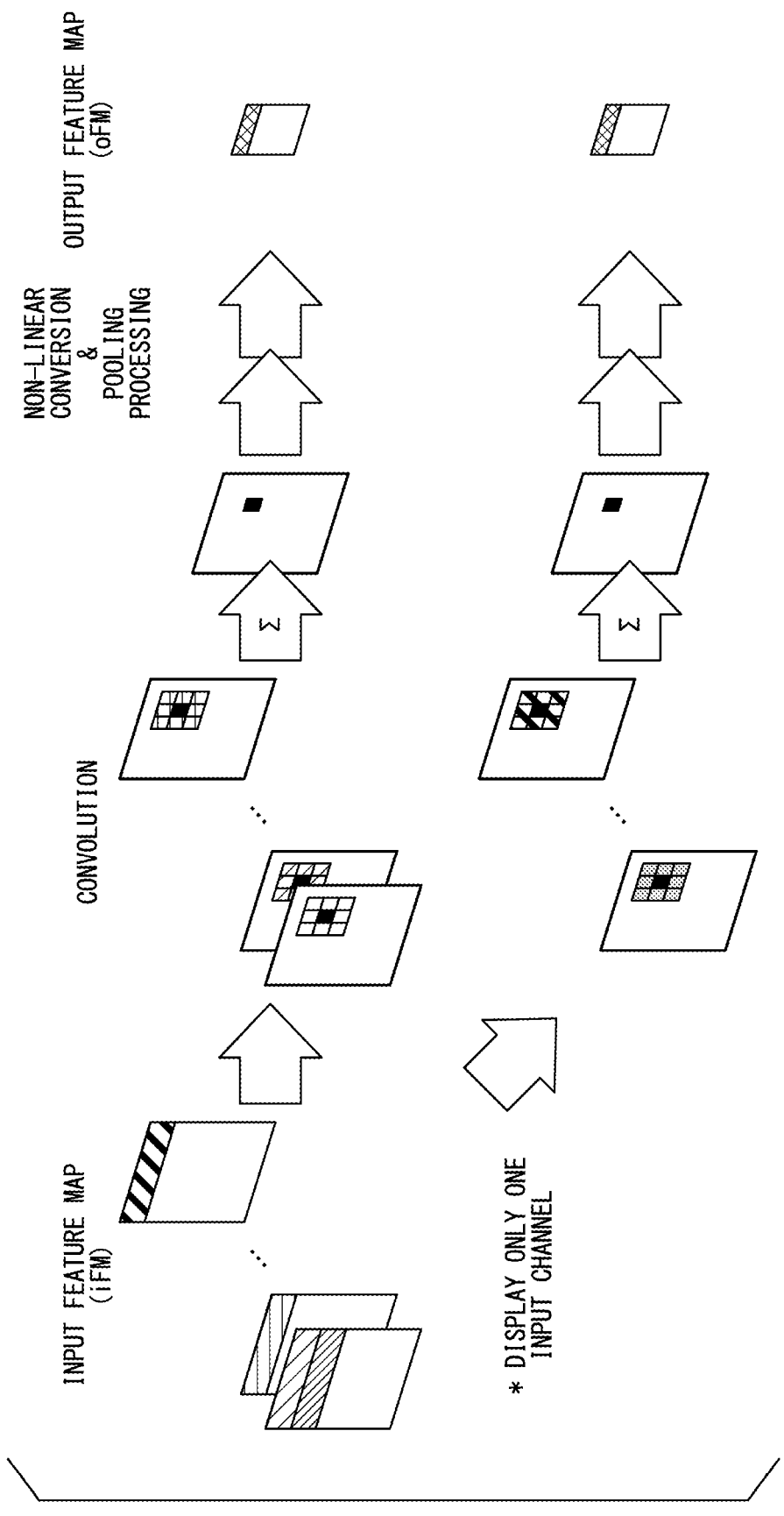
FIG. 12 is a diagram showing a processing image of CNN in the arithmetic processing device according to another embodiment of the present invention.

FIG. 12 is a diagram showing a processing image of CNN of the present embodiment. FIG. 12 shows an example of the number of oFM=2M, and displays only one input channel. It is assumed that the number of oFM exceeds the degree of output parallelism M and the number of oFM=M×m (where m>1). The CNN is a process of calculating one pixel of oFM from the same coordinate data of all iFMs.

At this time, if the oFMs are generated one by one, the iFM is subjected to the sliding window processing in the IBF, so that the data in the first part is overwritten and does not exist in the IBUF. Therefore, the iFM must be read again from the DRAM every time a new oFM is generated.

Therefore, in the present embodiment, control is performed so that all oFMs that can be processed by the data stored in the IBUF are generated. Specifically, after performing as many processes as possible for one oFM from the iFM (only part of which is stored) input to the IBUF, the process corresponding to the next oFM is performed without updating the IBUF (where coefficients are appropriately switched).

At this time, it is efficient to set the "as many processes as possible" to the division area size as a unit on the IBUF. This is because the data for one iFM plane that fits in one SRAM that constitutes IBUF is the divided area size, and if processing is performed in this unit, when the processing for the number of oFMs to be output is completed, the data for one SRAM is used and can be released. The division area size is the amount of data on the iFM and does not necessarily match the amount of data on the oFM. This is because reduction occurs due to the pooling process.

The reason why the oFM is not changed in pixel units is that it is more efficient to transfer a certain amount of data onto the DRAM. If there is no problem with the buffer size and transfer efficiency, switching may be performed in pixel units.

As described above, in the present embodiment, all the processing that can be performed by the contained data is performed before the sliding window processing is performed. It should be noted that the output data is not output by completing one oFM at a time, but part of a plurality of oFMs is output little by little, and finally a plurality of oFMs are completed and output.

Figure 13:
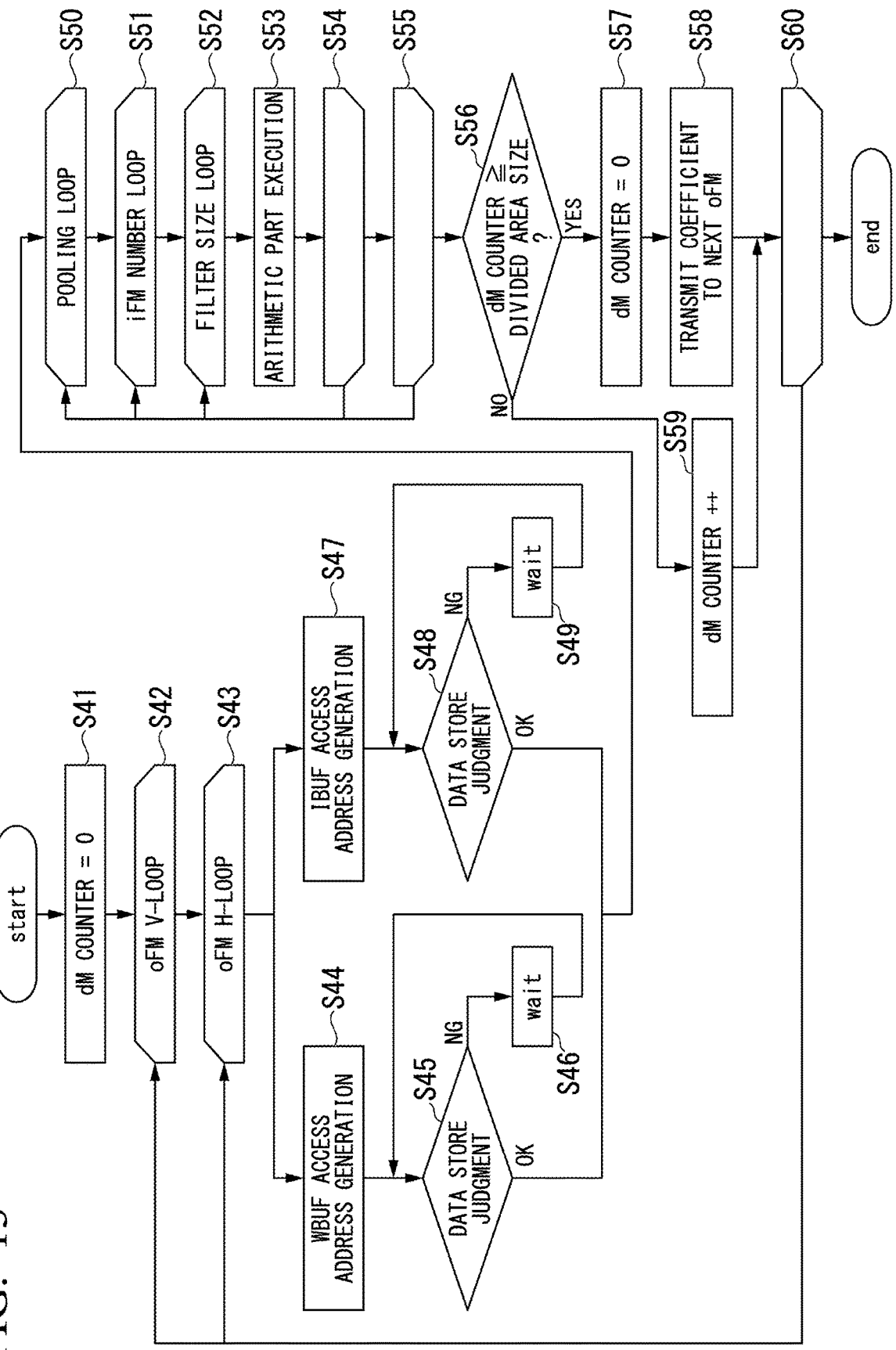
FIG. 13 is a diagram showing an example of a control flow of the SRAM read controller in the arithmetic processing device according to the embodiment of the present invention.

FIG. 13 is a diagram showing an example of a control flow of the SRAM read controller in the arithmetic processing device according to the present embodiment. The "dM counter" corresponds to a loop counter for the size of the divided area. First, in step S41, dM counter=0. Then, the oFM_V loop starts from step S42, and the oFM_H loop starts from step S43. The oFM_V loop is a loop that processes oFM data in the V direction (horizontal direction), and the oFM_H loop is a loop that processes oFM data in the H direction (vertical direction).

The WBUF access address is generated in step S44, and the IBUF access address is generated in parallel in step S47.

When the WBUF access address is generated in step S44, the data storage determination is performed in step S45. If the result of the data storage determination is good (OK), the process proceeds to the pooling group in step S50. If the result of the data storage determination is not good (NG), the process waits in step S46 and returns to step S45.

Further, when the IBUF access address is generated in step S47, the data storage determination is performed in step S48. If the result of the data storage determination is good (OK), the process proceeds to the pooling group in step S50.

If the result of the data storage determination is not good (NG), the process waits in step S49 and returns to step S48.

After the pooling group in step S50, the process proceeds to the iFM number loop in step S51 and the filter size loop in step S52, and the processing of the arithmetic part is performed in step S53. In steps S54 and S55, it is determined whether or not each loop may be completed. If not, the loop returns to each loop, and if all the loops are completed, the process proceeds to step S56.

In step S56, it is determined whether or not the dM counter is equal to or larger than the division area size. If the dM counter is equal to or larger than the division area size, the process proceeds to step S57, and dM counter=0. Then, in step S58, the coefficient is transmitted to the next oFM, and the process proceeds to step S60.

If the dM counter is not equal to or larger than the divided area size (if the dM counter is less than the divided area size), the process proceeds to step S59, and the value of the dM counter is increased. Then, the process proceeds to step S60.

In step S60, it is determined whether the oFM_V loop and the oFM_H loop is completed. If not, the loop returns to each loop, and if all the loops are completed, the control flow ends.

Figure 14:
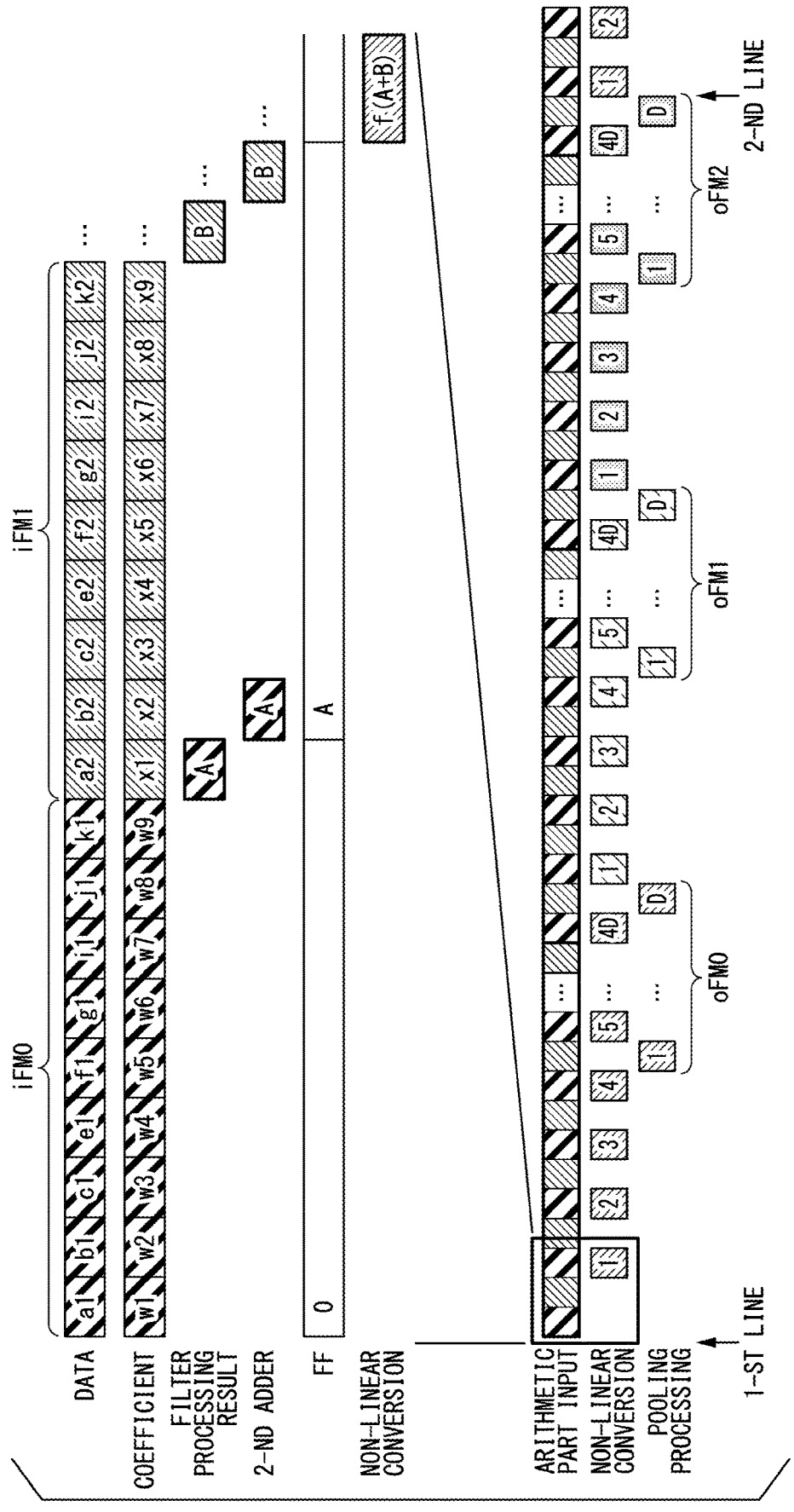
FIG. 14 is a diagram showing a timing chart at the time of arithmetic in the arithmetic processing device according to the embodiment of the present invention.

FIG. 14 shows an example of a timing chart in the case of the iFM number=2N and the oFM number=3M in the arithmetic processing device according to the present embodiment. Assuming that the division area size is 4D, the number of data on the oFM is equal to the number of oFM×D because of pooling.

Figure 15:
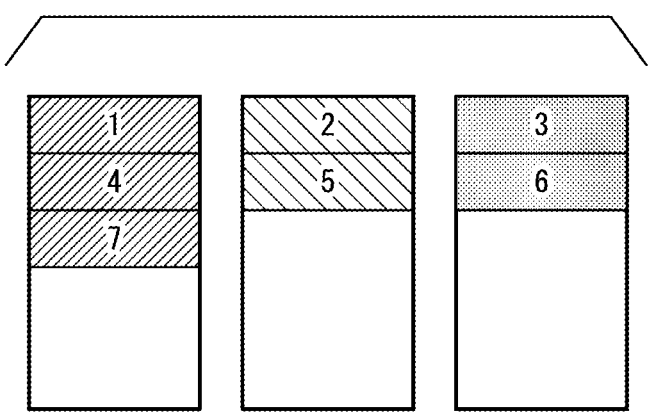
FIG. 15 is a diagram showing an output image of a DRAM to which data is written in the arithmetic processing device according to the embodiment of the present invention.

Since the data output part can count the number of valid data after pooling and identify which oFM is currently received, it is appropriately developed on the DRAM according to the identification result. FIG. 15 is a diagram showing an output image of the DRAM from which the data is written. The numbers in the figure indicate the output order.

As described above, in the present embodiment, the SRAM read controller in the IBUF manager extracts data from the IBUF so as to perform the filter processing of m sheets of oFM to be output from the same input data. Then, the data output part counts the valid data, identifies which oFM data it is, generates an appropriate address, and outputs it to the DRAM. As a result, the number of oFMs exceeding the output parallelism can be output without reloading the iFM.

That is, the SRAM read controller reads part of the iFM data from the IBUF. The arithmetic part performs arithmetic processing of part of the iFM data input from the SRAM read controller (processes the data at the read location), and generates part of the oFM data. Then, when this process is completed, the next portion of the iFM data may be processed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

As used herein, the following directional terms "front, back, top, bottom, right, left, vertical, horizontal, row, column" as well as any other similar directional terms refer to those directions of a device equipped with the present invention. Accordingly, these terms, as utilized to describe the present invention should be interpreted relative to a device equipped with the present invention.

The present invention can be widely applied to arithmetic processing devices that perform deep learning using a convolutional neural network. Even if the iFM size or the number of iFMs is too large to fit in the data storage memory (IBUF), arithmetic processing and data update can be seamlessly performed without overlapping the filter size.

What is claimed is:

1. An arithmetic processing device for deep learning that performs convolution processing and full-connect processing, comprising:
    a data storage memory manager including
        a data storage memory composed of 3 or more SRAMs,
        a counter configured to count the number of valid input data from input feature map data and converts it into a coordinate,
        an SRAM write controller configured to convert the coordinate converted by the counter into an address in the data storage memory and store the input feature map data in the data storage memory, and
        an SRAM read controller configured to receive a request from outside and extract the stored input feature map data by a predetermined method from the data storage memory;
    a coefficient storage memory manager that has a coefficient storage memory for storing coefficients, refers to the status of the data storage memory manager and extracts a coefficient corresponding to data to be extracted from the data storage memory manager from the coefficient storage memory;
    a data input part configured to acquire the input feature map data from an external storage memory;
    a coefficient input part configured to acquire the coefficient from the external storage memory;
    an arithmetic part with a configuration in which N-dimensional data is input, processed in parallel, and M-dimensional data is output (where N and M are positive numbers greater than 1), configured to acquire the input feature map data from the data storage memory, acquire the coefficient from the coefficient storage memory, and perform a filter processing, a cumulative addition processing, a non-linear arithmetic processing, and a pooling processing;
    a data output part configured to convert the M-dimensional data output from the arithmetic part to output as output feature map data to the external storage memory;
    a controller configured to control the data storage memory manager, the coefficient storage memory manager, the data input part, the data output part, and the arithmetic part;
    wherein the counter generates an ID of the input feature map data that has been input,
    the SRAM write controller virtually divides each of the SRAMs constituting the data storage memory into a plurality of areas, switches the area to be written by the ID and controls so that different input feature maps of the same coordinate are stored in the same SRAM,
    the SRAM read controller switches the address so as to access the area corresponding to the ID of the input feature map data to be extracted,
    the arithmetic part includes:
        a filter arithmetic part configured to perform a filter arithmetic on the N-dimensional data in parallel,
        a first adder configured to cumulatively add arithmetic results of the filter arithmetic part,
        a second adder configured to cumulatively add cumulative addition results of the first adder in a subsequent stage, and
        a flip-flop configured to hold a cumulative addition result of the second adder, and
        an arithmetic controller configured, to generate an ID of the input feature map data, to acquire from the coefficient storage memory manager the coefficient of the same ID as the input feature map data input from the SRAM read controller, and to control the second adder to cumulatively add cumulative addition results of the first adder until all input feature map data is collected, so as to extract a plurality of input feature map data stored in one data storage memory.

2. The arithmetic processing device according to claim 1, wherein
    the arithmetic part performs arithmetic processing for each input feature map data of the same coordinate, and
    the SRAM write controller releases the area in which the input feature map data of the same coordinate is stored every time the arithmetic processing of the input feature map data of the same coordinate is completed and stores data that is a continuation of the input feature map data.

3. The arithmetic processing device according to claim 1, wherein
    the SRAM read controller reads the input feature map data from the data storage memory so as to perform arithmetic processing on one input feature map data to output the output feature map data for m sheets, and
    the data output part counts valid data to identify the output feature map data, and appropriately generates an address in the output feature map data to output to the external storage memory.

4. The arithmetic processing device according claim 1, wherein
    the SRAM read controller reads a portion of the input feature map data from the data storage memory,
    the arithmetic part performs arithmetic processing of the portion of the input feature map data input from the SRAM read controller to generate part of the output feature map data, and,
    when a processing of the portion of the input feature map data is completed, another portion of the input feature map data is processed.

* * * * *